United States Patent
Fan et al.

(10) Patent No.: US 7,740,729 B1
(45) Date of Patent: Jun. 22, 2010

(54) METHOD AND SYSTEM FOR CONTROLLING THE ECCENTRICITY OF BONDED MULTIPLE OPTICAL DISCS

(75) Inventors: Kai Leung Fan, Hong Kong (CN);
Ming Sang Yeung, Hong Kong (CN);
Guoyong Zhang, Dongguan (CN);
Congyi Mu, Dongguan (CN); Hong Wu,
An Yang (CN); Ming Li, An Yang (CN)

(73) Assignees: Dongguan Anwell Digital Machinery Co., Ltd. (CN); Anwell Precision Technology (HK) Limited, Hong Kong (HK)

( * ) Notice: Subject to any disclaimer, the term of this patent is extended or adjusted under 35 U.S.C. 154(b) by 737 days.

(21) Appl. No.: 11/670,191

(22) Filed: Feb. 1, 2007

(51) Int. Cl.
*B32B 37/00* (2006.01)
(52) U.S. Cl. ............... 156/272.2; 156/273.5; 156/273.7
(58) Field of Classification Search ............. 156/272.2, 156/273.5, 273.7, 567, 74
See application file for complete search history.

(56) References Cited

U.S. PATENT DOCUMENTS

| | | | |
|---|---|---|---|
| 6,224,702 B1 * | 5/2001 | Kitano et al. | 156/74 |
| 7,479,202 B1 * | 1/2009 | Fan et al. | 156/272.2 |
| 7,591,920 B1 * | 9/2009 | Fan et al. | 156/272.2 |
| 2004/0134603 A1 * | 7/2004 | Kobayashi et al. | 156/272.8 |
| 2006/0011306 A1 * | 1/2006 | Eichlseder | 156/556 |
| 2007/0187040 A1 * | 8/2007 | Edenhofer et al. | 156/391 |

FOREIGN PATENT DOCUMENTS

| | | |
|---|---|---|
| EP | 1580741 A2 * | 9/2008 |
| JP | 2006-286165 A * | 10/2006 |
| WO | WO-98/57806 A1 * | 12/1998 |

* cited by examiner

*Primary Examiner*—Jeff H Aftergut
(74) *Attorney, Agent, or Firm*—Wuxi Sino IP Agency, Ltd.; Joe Zheng

(57) ABSTRACT

Techniques for bonding two disks with a minimized eccentricity (ECC) are disclosed. A positioning header includes an ECC controlling structure that further includes a positioning header. In one embodiment, the position header includes three members that form a round stand with a diameter smaller than the inner diameter of the disks. The round stand expands to the inner diameter of the disks to close the gap as a result of the difference between the two diameters when the three members are caused to expand. In one embodiment, the movement of the three members is controlled by magnetic means. Depending on the positions of the ECC controlling structure, the three members are expanded from or restored to their default positions.

20 Claims, 6 Drawing Sheets

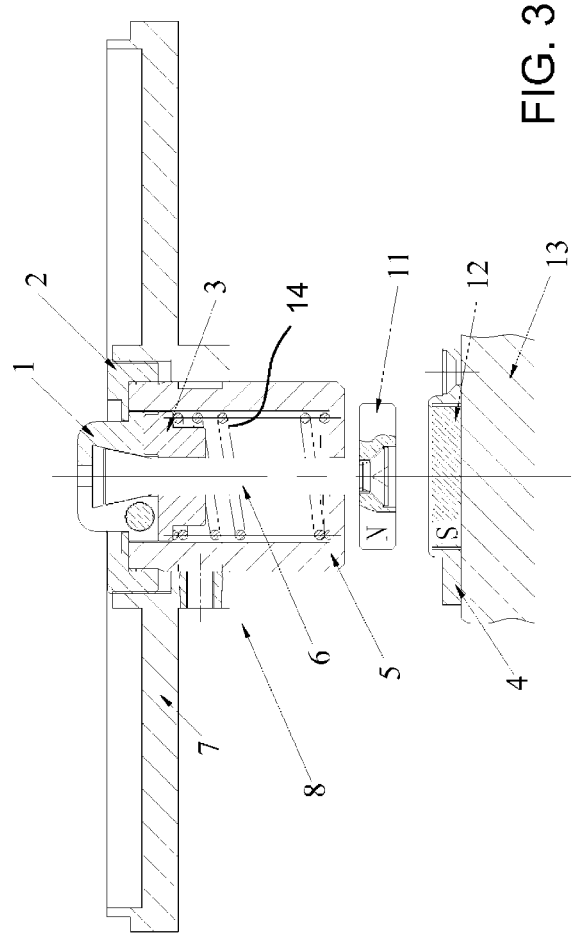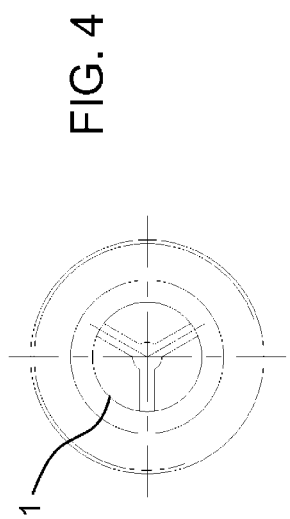

METHOD AND SYSTEM FOR CONTROLLING THE ECCENTRICITY OF BONDED MULTIPLE OPTICAL DISCS

BACKGROUND OF THE INVENTION

1. Field of the Invention

The invention is generally related to the area of optical information recordable medium. More particularly, the present is related to method and systems for controlling the eccentricity of bonded multiple optical discs, wherein an example of the bonded multiple optical discs is double-sided or double layered DVDs.

2. The Background of Related Art

One of the most popular optical storage medium is DVD (Digital Versatile Disc). Technically, DVD is a relatively new generation of optical disc storage technology. It is much larger in data capacity and faster in reading than CD and can hold cinema-like video, better-than-CD audio, still photos, and computer data. DVD aims to encompass home entertainment, computers, and business information with a single digital format. It has replaced laserdisc, is well on the way to replacing videotape and video game cartridges, and could eventually replace audio CD and CD-ROM. DVD has widespread support from all major electronics companies, all major computer hardware companies, and all major movie and music studios. With this unprecedented support, DVD became the most successful storage device of all time in the history of optical storage technologies.

There are a number of parameters in terms of quality of an optical medium (e.g., a DVD). One of them is an eccentricity (ECC) that defines a disparity between a geometric center of a round disc and a center of a data track. The geometric center is a center of a circle representing a round disc while the center of a data track (or data center) is a reference center from which the data tracks circle from the inside of the disc to the outside. As the reading/writing speed of a disc and the data density thereon increase, as well as the time to locate a data track decreases, the ECC becomes considerably important in overall quality parameters of an optical medium.

A double-layered DVD is formed by bonding two disks, each being 0.6 mm thick and commonly referred to as L0 or L1 substrate or disk. When being played in a DVD player, a DVD is positioned with reference to the geometric center of L0. If the data center of L0 is not matched with the geometric center of L0, there is an ECC on L0. Likewise, if the data center of L0 is not matched with the geometric center of L1, there is an ECC on L1. Further if the geometric centers of L0 and L1 are not matched, the ECC on L0 or L1 could be accumulated. FIG. 1 illustrates an ECC referenced by S when the centers of the two disks L0 and L1 are not exactly matched.

In a traditional manufacturing process, L0 and L1 substrates are applied with a layer of glue in between. L0 and L1 substrates are then bonded on a bonding station under a UV curing means. A bonding structure used in a bonding station, as shown in FIG. 2, includes a shaft 200 and a tray 202. The shaft 200 has a diameter of 14.8 mm while the inner diameter of the two disks is 15 mm. As a result, there is a gap that could introduce the disparity when the two disks are boned together. Such a gap leads to the ECC and causes the quality issue of the final disc.

There is a need for techniques to control the processing of bonding at least two disks so as to minimize the ECC of a final disc formed by the at least two bonded disks.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for bonding at least two disks with a minimized eccentricity (ECC). According to one aspect of the present invention, a positioning header includes an ECC controlling structure that further includes a positioning header. In one embodiment, the position header includes three members that form a round stand with a diameter smaller than the inner diameter of the disks. The round stand expands to the inner diameter of the disks to close the gap as a result of the difference between the two diameters when the three members are caused to expand. In one embodiment, the movement of the three members is controlled by magnetic means. Depending on the positions of the ECC controlling structure, the three members are expanded from or restored to their default positions.

The present invention may be implemented as method, process, or apparatus. According to one embodiment of the present invention, the present invention is a method for bonding at least two disks, the method comprises: providing a positioning header including a number of members, where the members, when in default positions, form a default round stand with a first diameter smaller than a second diameter; placing two disks with an inner hole measured by the second diameter on the positioning header, wherein the two disks have been already applied a layer of a type of adhesive therebetween; and causing the members to expand up to a limit by the second diameter so that a gap caused by a difference between the first diameter and the second diameter is minimized while the two disks are being bonded, as a result, an eccentricity of the bonded two disks is minimized.

According to another embodiment of the present invention, the present invention is a system for bonding two disks, the system comprises: a positioning header including a number of members, where the members, when in default positions, form a default round stand with a first diameter smaller than a second diameter; a tray with the positioning header in a center thereof to receive two disks, wherein the two disks have been already applied a layer of a type of adhesive therebetween; and a mechanism to cause the members to expand up to a limit by the second diameter so that a gap caused by a difference between the first diameter and the second diameter is minimized while the two disks are being bonded, as a result, an eccentricity of the bonded two disks is minimized.

One of the objects, features, and advantages of the present invention is to provide solutions for minimizing the ECC in bonding multiple optical mediums (e.g., disks).

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3 shows a cross section view of a bonding structure according to one embodiment of the present invention;

FIG. 4 shows a top view of an exemplary positioning header to show that the positioning header includes three expandable members that can be expanded when necessary to the ECC of a disc (two bonded disks);

DETAILED DESCRIPTION OF THE PREFERRED EMBODIMENTS

Figure 1:
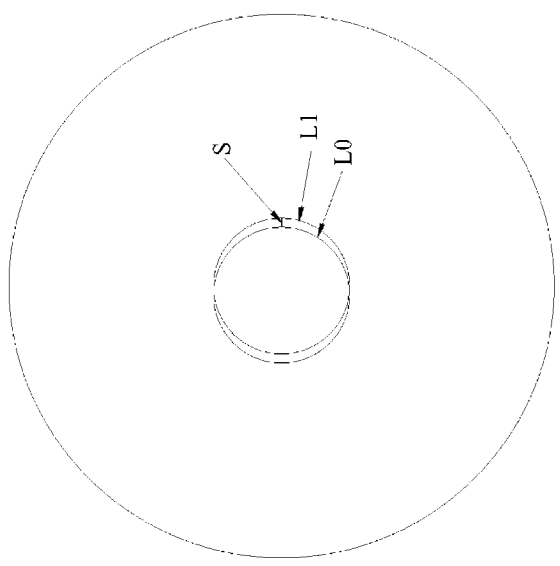
FIG. 1 illustrates an ECC referenced by S when the centers of the two disks L0 and L1 are not exactly matched.
Figure 2:
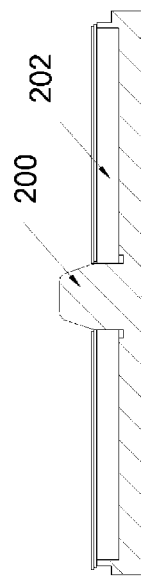
FIG. 2 shows a cross section view of a structure to receive disks for bonding.

The detailed description of the present invention is presented largely in terms of procedures, steps, logic blocks, processing, or other symbolic representations that directly or indirectly resemble the manufacturing processing and optical medium. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Referring now to the drawings, in which like numerals refer to like parts throughout the several views. FIG. 3 shows a cross section view of a bonding structure 300 according to one embodiment of the present invention. As illustrated, the bonding structure 300 includes a tray 7 expanded from an ECC controlling structure 8. The tray 7 is provided to receive disks. Depending on applications, the disks may be from a molding station, or a metalizing station. Two disks, each may have been stamped with digital contents, are to be bonded to form a double-sided disc.

In one embodiment, the ECC controlling structure 8 includes a positioning header 1, a lid 2, a drum 3, a magnetic station 4, a container or sleeve 5, a shaft 6, a magnetic means 11, and a spring 14. These parts form an ECC control mechanism to cause the positioning header 1 to minimize the ECC of a disc or two bonded disks. FIG. 4 shows a top view of the positioning header 1 to show that the positioning header 1 includes three members that can be expanded when necessary. The three expandable members, when in default positions, form a round stand with a default diameter. For receiving the commonly used DVD disks, the round stand has a diameter of 14.8 mm to readily accommodate the disks with an inner diameter being 15 mm. In one application, these disks are from one or two metalizing stations where each of the disks that has already been stamped is metalized.

According to one embodiment, three members are then displaced to move outwards simultaneously to expand to the limit of two disks being bonded. In other words, the gap as the result of the difference between the diameters of the DVD disks and the round stand (the default diameter) is minimized so as to minimize the ECC of the final disc.

Figure 5:
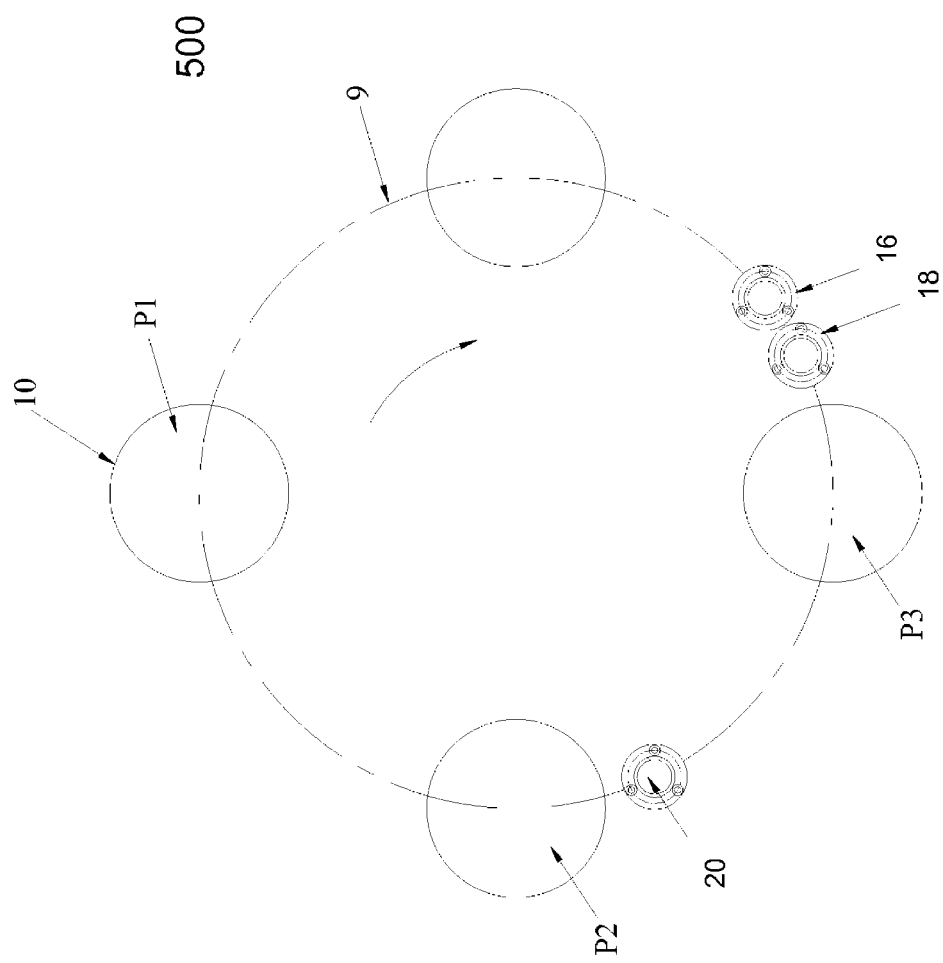
FIG. 5 shows an operation illustration of one embodiment of the present invention and is preferably understood in conjunction with FIG. 3.

FIG. 5 shows an operation illustration 500 of one embodiment of the present invention and is preferably understood in conjunction with FIG. 3. When the bonding structure 10 (e.g., the bonding structure 300 of FIG. 3) is at position P1, two disks, after applied with a layer of glue in between, are loaded on the tray 7 of the bonding structure 10. It is assumed that the two disks have an inner diameter of 15 mm. Because there is no any control on the shaft 6, the positioning header 1 is in default position (i.e., the round stand is in default size), namely the three members forming a round stand with a diameter of 14.8 mm to readily accommodate the disks with the inner diameter of 15 mm.

As the bonding structure 10 moves or rotates from position P1 to position P3 where the two disks will be bonded by a glue curing means (e.g., UV lighting), the bonding structure 10 passes at least one magnetic means (two magnetic means 16 and 18 are shown). Because the polarities of the two magnetic means 16 and 18 are opposite to that of the magnetic means 11, the magnetic means 11 is attracted towards to the magnetic means 16 and 18. As a result, the shaft 6 is pulled and the three members are then displaced to move outwards simultaneously to expand to the limit by the inner diameter of the two disks being bonded. In other words, the gap as the result of the difference between the diameters of the DVD disks and the round stand (the default size) is closed so as to minimize the ECC of the final disc (two bonded disks).

One of the features in the present invention is that the two disks are bonded with the minimized ECC. The bonding structure 10 is then moved from position P3 to position P2. As the bonding structure 10 is moving towards position P2, it passes through another magnetic means 20. Because the polarity of the magnetic means 20 is disposed to be identical to that of the magnetic means 11, the magnetic means 11 is repelled from the magnetic means 20. As a result, the shaft 6 is push towards its default position and the three members are then moved back simultaneously to restore their original positions to create the gap so that the bonded disk can be removed from the bonding structure 10 at position P2.

Figure 6:
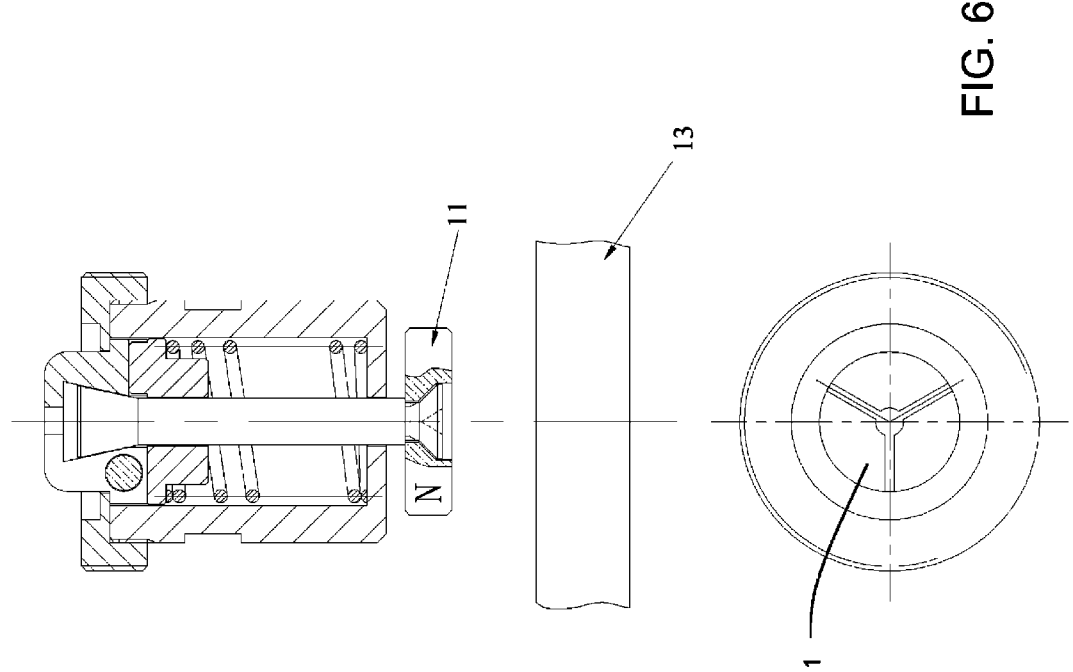
FIG. 6 shows a cross section view of the ECC controlling structure based on magnets, wherein the round stand formed by the three members is in default size and there is no external magnet on a control stand.

According to one embodiment, the magnetic means 11, 16, 18 or 20 is a permanent magnet. Those skilled in the art may appreciate that various circuits may be used to generate magnetic fields to control the shaft 6. FIG. 6 shows a cross section view of the ECC controlling structure 8 based on permanent magnets. The movement of the shaft 6 is affected by the magnet 11. The N polarity of the magnet 11 is towards the control stand 13. The shaft 6 is kept in default position by the spring 14 with no magnet on the control stand 13. As a result, the three members in the positioning header 1 are in default position.

Figure 7:
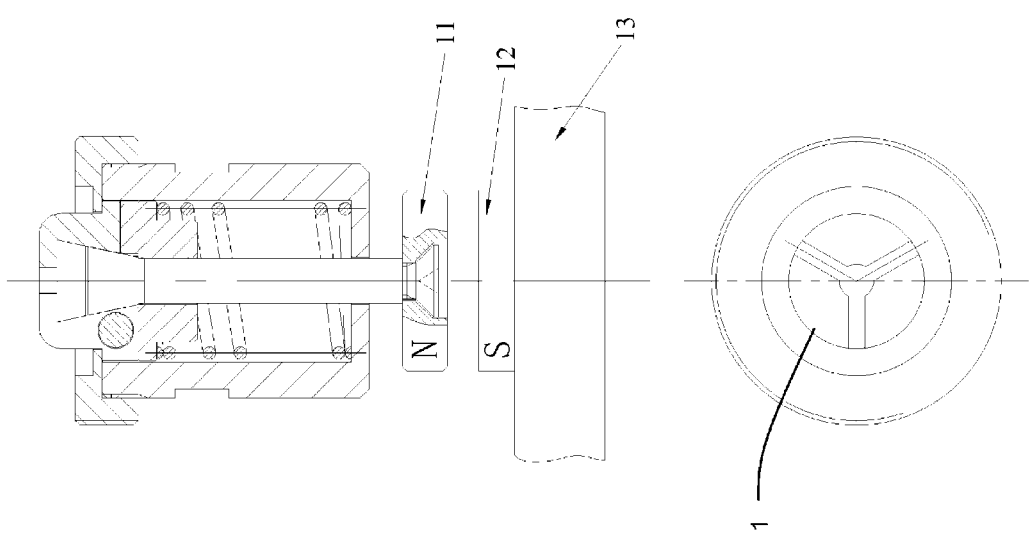
FIG. 7 shows a cross section view of the ECC controlling structure that reacts to a magnet placed on a control stand.

FIG. 7 shows a cross section view of the ECC controlling structure 8 that reacts to a magnet 12 placed on the control stand 13. The polarities of the two magnets 11 and 12 are just opposite (with the N polarity of the magnet 11 towards the S polarity of the magnet 12), the two magnets 11 and 12 are attracted to each other. Because the magnet 12 is not movable upwards, the magnet 11 is thus pulled downwards by the magnet 12, which causes the shaft 6 is pulled downwards. As a result of the retreat of the shaft 6, the three members in the positioning header 1 are displaced to move outwards simultaneously to expand to the limit by the inner diameter of the two disks being bonded.

Figure 8:
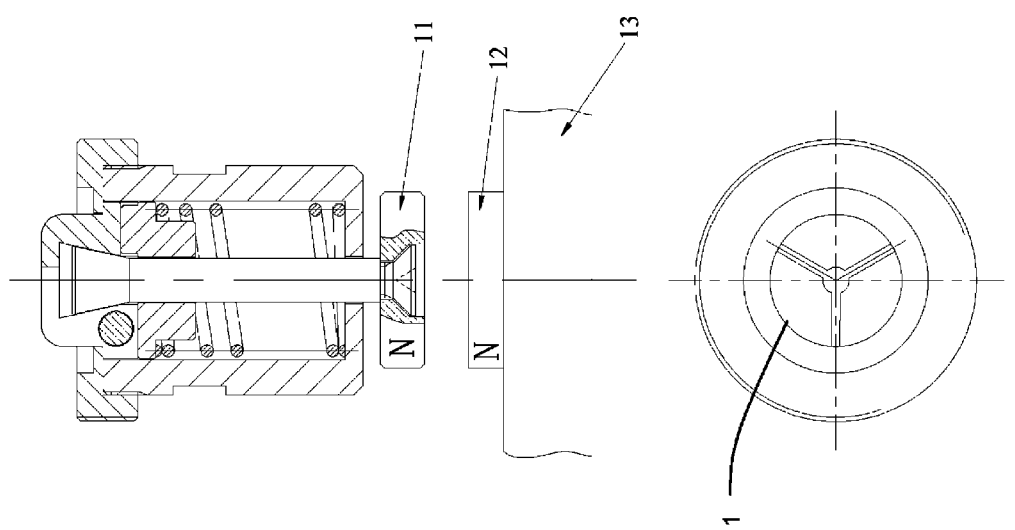
FIG. 8 shows a cross section view of the ECC controlling structure that reacts to another magnet placed on the control stand.

FIG. 8 shows a cross section view of the ECC controlling structure 8 that reacts to a magnet 12 placed on the control stand 13. The polarities of the two magnets 11 and 12 are identical (with the N polarity of the magnet 11 towards the N polarity of the magnet 12), the two magnets 11 and 12 are repelled from each other. Because the magnet 12 is not movable upwards, the magnet 11 is thus pushed upwards by the magnet 12 (assisted by the spring 14), which causes the shaft 6 to be pushed upwards. As a result of the restored position of the shaft 6, the three members in the positioning header 1 are restored to their default positions simultaneously so that the bonded disc may be readily removed from the tray and positioning header.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the present invention may be applied to non-disk like optical medium. Accordingly, the scope of the present invention is defined by the appended claims rather than the foregoing description of embodiments.

We claim:

1. A method for bonding at least two disks, the method comprising:
   providing a bounding structure including a positioning header with a number of members and first magnetic means, where the members, when in default positions, form a default round stand with a first diameter smaller than a second diameter;
   placing two disks with the second diameter on the positioning header, wherein the two disks have been already applied a layer of a type of adhesive therebetween; and
   causing the members to expand up to a limit by the second diameter, by magnetic effects between the first and second magnetic means when the bounding structure is moved over the second magnetic means so that a gap caused by a difference between the first diameter and the second diameter is minimized while the two disks are being bonded, thereby an eccentricity of the bonded two disks is minimized.

2. The method as recited in claim 1, further comprising:
   causing the members to restore to the default positions so that the bonded two disks can be readily removed from the positioning header.

3. The method as recited in claim 2, wherein the positioning header is controlled by a shaft that is in return controlled by the first magnetic means.

4. The method as recited in claim 3, wherein the first magnetic means includes a use of an electromagnetic field or a magnet.

5. The method as recited in claim 3, wherein the members are expanded from the default round stand by controlling the magnetic means.

6. The method as recited in claim 1, wherein the bounding structure further comprises a tray to receive the disks.

7. The method as recited in claim 6, wherein each of the disks is from a molding station.

8. The method as recited in claim 7, wherein each of the disks is further went through a metalizing station.

9. The method as recited in claim 8, wherein there are three members in the positioning header, the adhesive is cured to bond the two disks when the three members are expanded to the limit of the second diameter.

10. The method as recited in claim 1, wherein the members in the positioning header form the default round stand when the bounding structure is rotated over external magnetic means having an identical polarity as that of the first magnetic means.

11. A system for bonding at least two disks, the system comprising:
    a bounding structure including a positioning header with a number of members and first magnetic means, the positioning header being mechanically controlled by the first magnetic means, wherein the members, when in default positions, form a default round stand with a first diameter smaller than a second diameter;
    a tray with the positioning header in a center thereof to receive two disks, wherein the two disks have been already applied a layer of a type of adhesive therebetween; and
    a mechanism to cause the members to expand up to a limit by the second diameter when the bounding structure is moved over second magnetic means, wherein the mechanism is being controlled by magnetic effects between the first and second magnetic means so that a gap caused by a difference between the first diameter and the second diameter is minimized while the two disks are being bonded, thereby, an eccentricity of the bonded two disks is minimized.

12. The system as recited in claim 11, wherein the positioning header is controlled by a shaft that is in return controlled by the first magnetic means.

13. The system as recited in claim 12, wherein the first magnetic means includes a use of an electromagnetic field or a magnet.

14. The system as recited in claim 12, wherein the members are displaced from the default round stand by the first magnetic means controlled by the second magnetic means.

15. The system as recited in claim 11, wherein each of the disks is from a molding station.

16. The system as recited in claim 15, wherein each of the disks is further went through a metalizing station.

17. The system as recited in claim 16, wherein there are three members in the positioning header, the adhesive is cured to bond the two disks when the three members are expanded to the limit of the second diameter.

18. The system as recited in claim 11, wherein the members are in the positioning header are in the default positions when the bounding structure is over an external magnetic means having an identical polarity to that of the first magnetic means.

19. The system as recited in claim 11, wherein the first diameter is 14.8 mm and the second diameter is 15 mm.

20. The system as recited in claim 11, wherein the disks are optical disks.

* * * * *